(12) United States Patent
Reisbick

(10) Patent No.: US 11,812,352 B2
(45) Date of Patent: Nov. 7, 2023

(54) LOW-POWER WIRELESS SENSOR DEVICE ACTIVATION

(71) Applicant: DISH Wireless L.L.C., Englewood, CO (US)

(72) Inventor: Richard Reisbick, Westminster, CO (US)

(73) Assignee: DISH Wireless L.L.C, Littleton, CO (US)

(*) Notice: Subject to any disclaimer, the term of this patent is extended or adjusted under 35 U.S.C. 154(b) by 172 days.

(21) Appl. No.: 17/215,909

(22) Filed: Mar. 29, 2021

(65) Prior Publication Data

US 2021/0321240 A1    Oct. 14, 2021

Related U.S. Application Data

(60) Provisional application No. 63/009,681, filed on Apr. 14, 2020.

(51) Int. Cl.
| | |
|---|---|
| *H04W 4/80* | (2018.01) |
| *H04W 52/02* | (2009.01) |
| *H04B 5/00* | (2006.01) |

(52) U.S. Cl.
CPC ............ *H04W 4/80* (2018.02); *H04B 5/0031* (2013.01); *H04B 5/0043* (2013.01); *H04B 5/0056* (2013.01); *H04W 52/0229* (2013.01)

(58) Field of Classification Search
CPC ... H04W 4/80; H04W 52/0229; H04W 12/06; H04W 4/40; H04B 5/0031; H04B 5/0043; H04B 5/0056; Y02D 30/70

USPC .......................................................... 455/41.1
See application file for complete search history.

(56) References Cited

U.S. PATENT DOCUMENTS

| | | | | |
|---|---|---|---|---|
| 8,287,327 | B1* | 10/2012 | Ghaly | A63H 3/52 |
| | | | | 446/330 |
| 9,633,243 | B1* | 4/2017 | Geist | G06Q 10/00 |
| 10,104,454 | B2* | 10/2018 | Sullivan | H04W 4/44 |
| 10,198,605 | B1* | 2/2019 | Salour | G06F 21/445 |
| 10,685,326 | B1* | 6/2020 | Ewing | G06Q 10/0875 |
| 10,701,560 | B1* | 6/2020 | Lerner | G06Q 20/32 |
| 10,959,747 | B1* | 3/2021 | Guo | A61B 34/70 |
| 11,176,541 | B1* | 11/2021 | Gupta | G06F 3/167 |
| 11,416,844 | B1* | 8/2022 | Osterkamp | G06Q 20/3224 |
| 11,457,810 | B2* | 10/2022 | Van Tassel | H04W 48/10 |
| 11,461,454 | B2* | 10/2022 | Stein | H04L 63/0442 |
| 2008/0280558 | A1* | 11/2008 | Arunan | H04W 28/06 |
| | | | | 455/41.1 |
| 2010/0277280 | A1* | 11/2010 | Burkart | H04Q 9/00 |
| | | | | 340/10.1 |

(Continued)

*Primary Examiner* — Ankur Jain
(74) *Attorney, Agent, or Firm* — KILPATRICK TOWNSEND & STOCKTON, LLP

(57) ABSTRACT

Various arrangements for performing wireless sensor device activation are presented. A sensor device may be manufactured such that a function of the sensor device is disabled and the sensor device is activated for passive near-field communication (NFC). A housing of the sensor device may be sealed such that only wireless communication with the sensor device is available. An NFC carrier field and a wake message can be received from an activation device. In response to validating the wake message, a sensor device identifier may be transmitted by modulating the NFC carrier field and the disabled function of the sensor device may be enabled.

18 Claims, 5 Drawing Sheets

(56) References Cited

U.S. PATENT DOCUMENTS

| | | | |
|---|---|---|---|
| 2011/0320243 A1* | 12/2011 | Khan | G07F 17/246 |
| | | | 705/13 |
| 2018/0014787 A1* | 1/2018 | Ganton | A61B 5/0538 |
| 2018/0027490 A1* | 1/2018 | Liu | H04B 7/18532 |
| | | | 370/311 |
| 2018/0184944 A1* | 7/2018 | Bodewes | A61B 5/076 |
| 2018/0354571 A1* | 12/2018 | Xie | B62H 3/00 |
| 2020/0077259 A1* | 3/2020 | Sachs | H04W 12/63 |
| 2022/0035327 A1* | 2/2022 | Sugumar | H04W 4/80 |

\* cited by examiner

LOW-POWER WIRELESS SENSOR DEVICE ACTIVATION

CROSS REFERENCES TO RELATED APPLICATIONS

This application claims priority to Provisional U.S. Application No. 63/009,681, filed on Apr. 14, 2020, entitled "Systems and Methods for Low-Power Wireless Sensor Device Activation, the entire disclosure of which is hereby incorporated by reference for all purposes.

BACKGROUND

Wireless communication with sensor devices can be an efficient form of communication, especially if there are a large number of sensor devices with which communication is desired. Some sensor devices may benefit from being sealed. For example, sensor devices that are to be installed in a wet environment or outside may benefit from being sealed such that water or other environmental conditions cannot enter the sensor device. However, if a sensor device is completely sealed, activating functionality of the sensor device may require wireless communication. Having wireless communication activated as part of or immediately following the manufacturing process may result in one or more power sources (e.g., a battery) of the sensor device becoming at least partially depleted before the sensor device is installed or otherwise deployed for use.

SUMMARY

Various embodiments are described related to a method for performing wireless sensor device activation. In some embodiments, a method for performing wireless sensor device activation is described. The method may comprise manufacturing a sensor device such that a function of the sensor device may be disabled and the sensor device may be activated for passive near-field communication (NFC). A housing of the sensor device may be sealed such that only wireless communication with the sensor device may be available. The method may comprise receiving, by the sensor device, an NFC carrier field from an activation device. The method may comprise receiving, by the sensor device, via NFC, a wake message. The method may comprise validating, by the sensor device, the wake message. The method may comprise, in response to validating the wake message, transmitting a sensor device identifier by modulating the NFC carrier field. The method may comprise, in response to validating the wake message, activating the function of the sensor device that was disabled when the sensor device was manufactured.

Embodiments of such a method may include one or more of the following features: the sensor device may be a parking sensor that detects whether a vehicle may be present above the parking sensor. The sensor device may comprise a magnetometer and the function of the sensor device that may be disabled may be making measurements using the magnetometer. Manufacturing may further comprise disabling a plurality of functions of the sensor device. One or more wireless communication interfaces may be disabled at manufacture. The method may comprise receiving, by the activation device, the sensor device identifier. The method may comprise mapping, by the activation device, the sensor device identifier to a parking space of a parking facility. Validating the wake message may comprise comparing an authentication identifier received as part of the wake message with a stored authentication identifier. Validating the wake message may further comprise determining that the authenticated identifier and the stored authentication identifier match. At least one month may elapse between manufacturing the sensor device and activating the function of the sensor device.

In some embodiments, a sensor device that performs wireless activation is described. The device may comprise a housing that may be sealed at manufacture to an outside environment. The device may comprise a battery sealed within the housing. The device may comprise a passive near-field communication (NFC) interface sealed within the housing. The passive NFC interface may be configured to be powered by an NFC carrier field received from an activation device. The device may comprise a sensor sealed within the housing. The sensor may be disabled at manufacture. The device may comprise a processing system sealed within the housing that communicates with the passive NFC interface and the sensor, the processing system being placed in a sleep mode at manufacture. The processing system may be configured to receive a wake message via the passive NFC interface. The processing system may be configured to validate the wake message. The processing system may be configured to, in response to validating the wake message, cause the passive NFC interface to transmit a sensor device identifier by modulating the NFC carrier field. The processing system may be configured to, in response to validating the wake message, activate the sensor that was disabled at manufacture.

Embodiments of such a device may include one or more of the following features: the sensor device may be a parking sensor that detects whether a vehicle may be present above the parking sensor. The sensor may be a magnetometer. The sensor device may further comprise a wireless communication interface. The wireless communication interface may be disabled at manufacture. The processing system may be further configured to activate an operating mode in response to validating the wake message. The processing system being configured to validate the wake message may comprise the processing system being configured to compare an authentication identifier received as part of the wake message with a stored authentication identifier. The processing system being configured to validate the wake message may comprise the processing system being configured to determine that the authenticated identifier and the stored authentication identifier match.

In some embodiments, a system that performs wireless activation is described. The system may comprise an activation device that creates an NFC carrier field. The system may comprise a sensor device. The sensor device may comprise a housing that may be sealed at manufacture to an outside environment. The sensor device may comprise a battery sealed within the housing. The sensor device may comprise a passive near-field communication (NFC) interface sealed within the housing. The passive NFC interface may be configured to be powered by the NFC carrier field received from the activation device. The sensor device may comprise a sensor sealed within the housing. The sensor may be disabled at manufacture. The sensor device may comprise a processing system sealed within the housing that may communicate with the passive NFC interface and the sensor, the processing system being placed in a sleep mode at manufacture. The processing system may be configured to receive a wake message via the passive NFC interface. The processing system may be configured to validate the wake message. The processing system may be configured to, in response to validating the wake message, cause the passive NFC interface to transmit a sensor device identifier by modulating the NFC carrier field. The processing system may be configured to, in response to validating the wake message, activate from the sleep mode and activate the sensor.

Embodiments of such a system may include one or more of the following features: the activation device may be configured to receive the sensor device identifier. The activation device may be configured to map the sensor device identifier to a parking space of a parking facility. The processing system being configured to validate the wake message may comprise the processing system being configured to compare an authentication identifier received as part of the wake message with a stored authentication identifier. The processing system being configured to validate the wake message may comprise the processing system being configured to determine that the authenticated identifier and the stored authentication identifier match. The sensor device may further comprise a wireless interface that may be disabled at manufacture. The processing system may be further configured to activate the wireless interface in response to validating the wake message.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Some types of devices, such as sensor devices, may be sealed to prevent water or, more generally, characteristics of the ambient environment from damaging components housed within the sensor device. A sensor device may have no external interface through which a user can provide physical input. Further, a battery may be sealed within the sensor device. If there is no external interface with which to connect, the only way to communicate with the sensor device may be through wireless communication.

Having a battery-powered sensor device continuously listening for a wireless communication may be problematic. After manufacture, many days, weeks, months, or even years may elapse before the sensor device is deployed in the field. During this time before deployment, if the sensor device is continuously listening for wireless communications, the battery of the sensor device may be significantly depleted or completely exhausted. Further, if other components of the sensor device are operating, such as an on-board processor and a sensor, the rate of discharge of the battery may be even greater.

Embodiments detailed herein allow for a sensor device to be sealed and placed in a low-power sleep mode at manufacture. While in the low-power sleep mode, functionality of the sensor device may be disabled except for a process that monitors for passive near-field communication (NFC). If a valid authentication identifier is provided to the sensor device as part of a wake message, the sensor device may wake from the sleep mode and be functioning in an operating mode. In the operating mode, one or more sensors may be active along with a wireless communication interface that allows for longer range communication than NFC, such as Wi-Fi® or Bluetooth®. If a valid authentication identifier is not provided to the sensor device, the sensor device may return to the low-power sleep mode until a valid authentication identifier is provided.

The NFC transmission that includes the wake up message may be transmitted by an NFC interface that generates an NFC carrier. The NFC carrier may provide sufficient power to the passive NFC interface of the sensor device that the sensor device only needs a small amount of power to communicate with the NFC interface. Further, since power is provided by the separate NFC interface via the NFC carrier, very little power needs to be used to maintain the sensor device in the low-power sleep mode while maintaining the ability to be woken. In other embodiments, rather than NFC, some wireless communication technology that also employs a carrier wave emitted by a transmitter being used to supply power to the receiver can be used.

Figure 1:
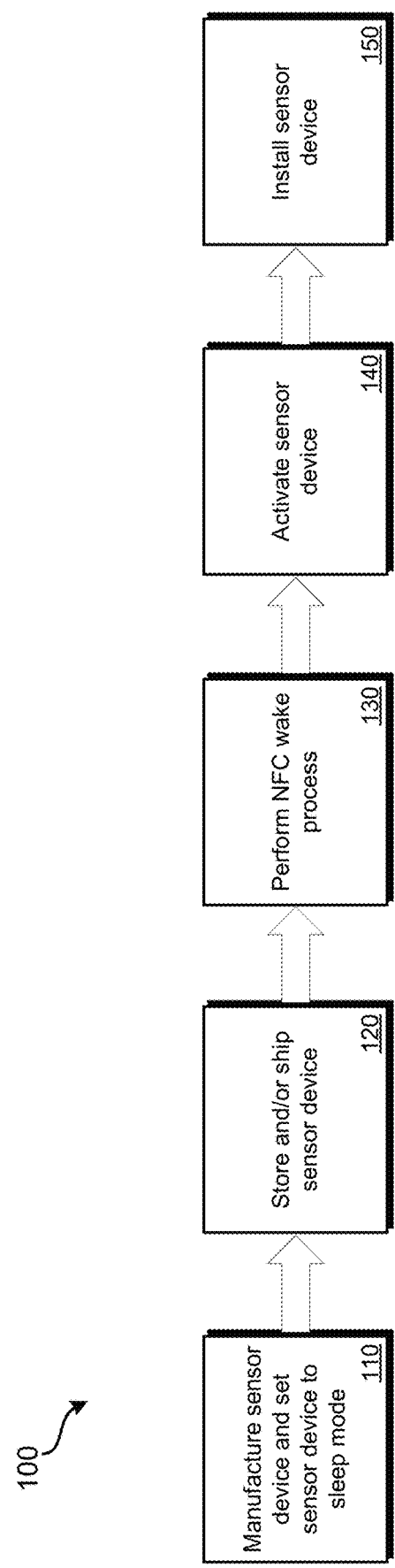
FIG. 1 illustrates a block diagram of a timeline of the deployment of a sensor device.

Further detail is provided in relation to the figures. FIG. 1 illustrates a block diagram of a timeline 100 of the deployment of a sensor device. In timeline 100, at block 110, a sensor device may be manufactured and the sensor device may be set to a low-power sleep mode as part of the manufacturing process. As part of the manufacturing process, the sensor device may be sealed such that it is difficult or impossible for the sensor device to be opened or interacted with other than via wireless communications. Further, as part of the manufacturing process, the sensor device may be packaged in packaging sufficient for storage and shipping, such as a cardboard box with packing material to protect the sensor device.

At block 120, the sensor device may be stored, shipped, or both. Block 120 may occur for a long period of time following block 110. For instance, days, weeks, months, even years may elapse after block 110 before block 130 is to be performed.

At block 130, an NFC wake process may be performed to wake the sensor device from the low-power sleep mode. The NFC wake process may be used to: 1) send a wake message indicating that the sensor device should wake; 2) transmit an identifier that the sensor device can analyze to determine whether the wake message is valid; and 3) gather information from the sensor device, such as a sensor device identifier.

At block 140, the sensor device may be activated using a NFC wake process. At block 140, the sensor device has exited the low-power mode and has entered an operating mode. In the operating mode, one or more sensors and/or wireless communication interfaces of the sensor device that was previously disabled are now enabled and functioning. Therefore, the amount of power consumed by the sensor device following block 140 can be significantly greater than at block 120.

At block 150, the sensor device may be installed at the location where it will perform sensor readings. For instance, if the sensor device is a parking sensor, the sensor device may be installed in a parking space such that when a vehicle is present in the parking space, the vehicle will be located directly above the parking sensor.

In other embodiments, block 150 may be performed prior to block 140. For example, if a parking facility is being built, it may be beneficial to hold off on activating parking sensors until shortly before the parking facility is opened for parking to preserve battery life.

Figure 2:
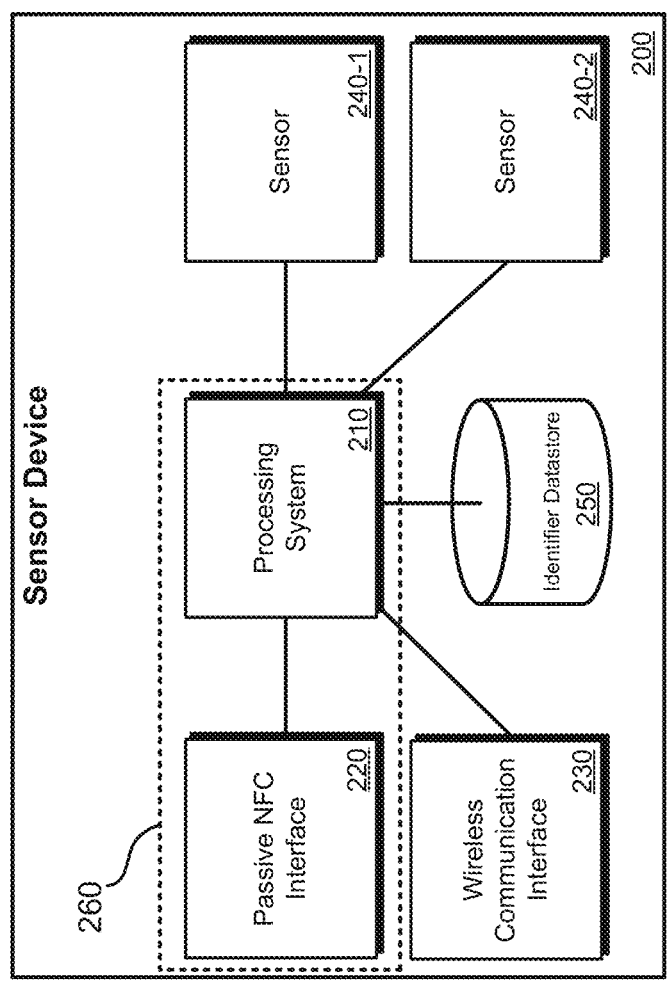
FIG. 2 illustrates a block diagram of an embodiment of a parking sensor device that performs low-power wireless device activation.

FIG. 2 illustrates a block diagram of an embodiment of sensor device 200 that performs low-power wireless device activation. Sensor device 200 can include: processing system 210; passive NFC interface 220; wireless communication interface 230; sensors 240 (sensor 240-1 and sensor 240-2); and identifier datastore 250. The various components of sensor device 200 can be within a sealed housing of the sensor device. For instance, the housing may be hard plastic or metallic housing. No form of user interface that permits direct user input or wired connection with an electronic or computerized device may be exposed on the housing. Therefore, the only way of communicating with sensor device 200 while in the low-power mode may be via wireless communication, such as via passive NFC interface 220.

Processing system 210 can represent one or more processors. In some embodiments, processing system 210 may be partially integrated with passive NFC interface 220 such that some form of processor is incorporated as part of passive NFC interface 220. Processing system 210 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Processing system 210 may be in communication with sensors 240, wireless communication interface 230, identifier datastore 250, and passive NFC interface 220. Passive NFC interface 220 may use little or no power while sensor device 200 is in a low-power sleep mode. However, while in low-power sleep mode, passive NFC interface 220 may be able to receive an NFC carrier signal and receive an authentication identifier. Passive NFC interface 220 may require that a separate NFC interface that is attempting to communicate with passive NFC interface 220 supply a carrier field. The carrier field supplied by the separate NFC interface can be modulated by passive NFC interface 220 to communicate with the separate NFC interface. Passive NFC interface 220 may be able to wake processing system 210 from the low-power sleep mode to an activation mode. (In other embodiments, rather than NFC, a wireless communication technology that similarly uses a carrier wave emitted by a transmitter that is modulated by a receiver can be used.) While in the low-power sleep mode, the processing system may use little power. In activation mode, other components of sensor device 200 may still be disabled; however, processing system 210 may be set to a relatively higher power operating mode that is able to evaluate a wake message by passive NFC interface 220 and, possibly, cause data to be transmitted via passive NFC interface 220. Processing system 210, while in activation mode, can determine whether sensor device 200 should return to the low-power sleep mode or should transition to the operating mode. The operating mode can represent a mode that uses more power than the sleep mode or the activation mode.

In the illustrated embodiment of sensor device 200, two sensors 240 are present. In other embodiments, greater or fewer numbers of sensors may be present. Sensors 240 can be used to sense various types of environmental conditions. Possible types of sensors include: magnetometers, motion sensors, passive infrared sensors, smoke sensors, carbon monoxide sensors, humidity sensors, temperature sensors, light sensors, distance sensors, ammonia sensors, etc. Sensors 240 may not be powered and, thus, may not perform measurements when sensor device 200 is in the low-power mode or, possibly, activation mode.

In some embodiments, one or more of sensors 240 are enabled in activation mode. In order for sensor device 200 to transition from activation mode to an operating mode, the sensor may be required to make a measurement within a particular range or above or below a particular value. For example, in alternate or in addition to a particular identifier being sent to the sensor device to trigger the mode transition, the sensor may be required, for instance, to measure a temperature between 20°-80° F. This requirement may help ensure that the sensor is located in a suitable environment and/or may serve as an additional security feature to ensure that the sensor device is intended to be activated by an authorized user.

One or more additional components, such as wireless communication interface 230, may be present that may not be powered or functional when sensor device 200 is in the low-power mode. Wireless communication interface 230 may permit communication to occur via a greater distance than passive NFC interface 220. For example, wireless communication interface 230 may use Wi-Fi® or Bluetooth®. In some embodiments, more than one wireless communication interface may be present, each of which may be disabled upon manufacture until the device enters an operating mode. While such wireless communication protocols may permit for a greater data rate transfer over greater distances than NFC, more power is required to power wireless communication interface 230. Therefore, it can be beneficial to keep wireless communication interface 230 always powered off until sensor device 200 is set to an operating mode.

Identifier datastore 250 can represent a non-transitory processor-readable medium, such as a solid-state memory, read-only memory, buffer, or hard drive. In some embodiments, identifier datastore 250 may be incorporated as part of processing system 210. Identifier datastore 250 may store data indicative of: a sensor device identifier; and authentication identifier. The sensor device identifier may uniquely identify sensor device 200, such as from other sensor devices produced by the same manufacturer. The authentication identifier may be used to authenticate a wake-up message received via passive NFC interface 220.

In the low-power mode of the sensor device 200, only component group 260 may be functional. A small amount of power may be provided to processing system 210 to keep it in a standby state while in the low-power mode in order to enable processing system 210 to respond to data received via passive NFC interface 220. Additionally, in the activation mode, only component group 260 may be powered. In some embodiments, if necessary, power may be supplied to identifier datastore 250 to permit processing system 210 to retrieve the authentication identifier and the sensor device identifier. Further, in some embodiments, no power needs to be provided to passive NFC interface 220 due to a carrier field from another device's NFC interface being used to power passive NFC interface 220.

While embodiments herein discuss parking space sensors, and, more generally, sensor devices, the activation process can be applied to other forms of sealed battery-powered devices that would benefit from being in a low-power mode following manufacture. For instance, some smart home devices, such as devices intended to be installed in a wet environment, may benefit from such an environmentally-sealed design.

Figure 3:
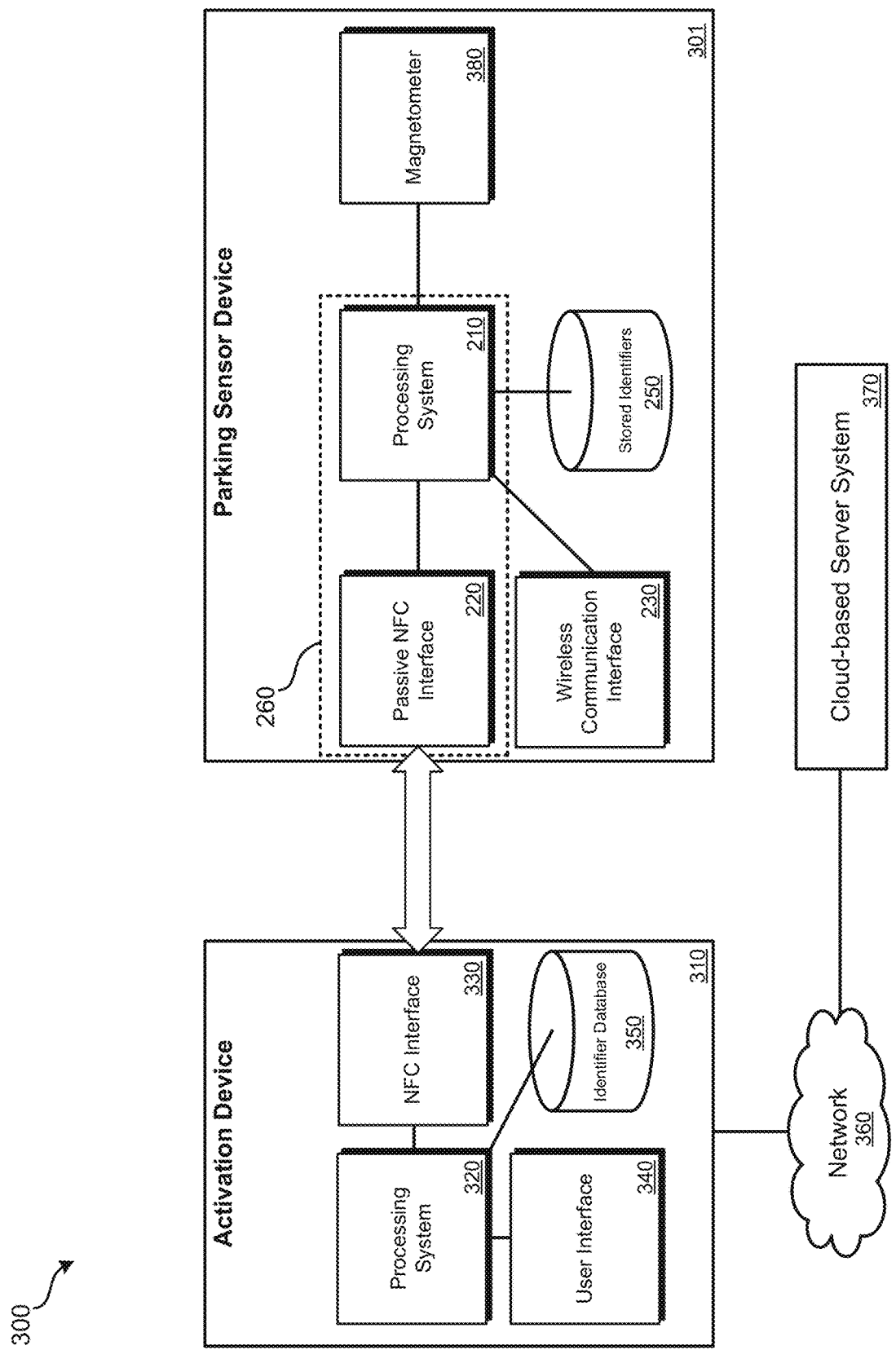
FIG. 3 illustrates a block diagram of an embodiment of a system that performs low-power wireless device activation.

FIG. 3 illustrates a block diagram of an embodiment of a system 300 that performs low-power wireless device activation. System 300 involves a sensor device, such as sensor device 200 of FIG. 2, being activated by activation device 310. In system 300, the sensor device is specifically a parking sensor device. Parking sensor device 301 may include a magnetometer 380. Parking sensor device 301 may be designed to be installed in a parking space such that when a vehicle parks in the parking space, it tends to park directly above parking sensor device 301. Based on the change in magnetic field caused by the vehicle, magnetometer 380 can detect the vehicle arriving and leaving from the parking space. Wireless communication interface 230 can be used to transmit an indication to a remote gateway device to indicate whether a vehicle is present.

System 300 includes activation device 310. Activation device 310 may be a mobile device, such as a dedicated activation device, a smartphone, a tablet computer, a personal digital assistant, etc. Activation device 310 can include: processing system 320; NFC interface 330; user interface 340; and identifier database 350. Processing system 320 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

Processing system 320 may be in communication with NFC interface 330, user interface 340, and identifier database 350. NFC interface 330 may generate an NFC carrier field. The NFC carrier field can be modulated by passive NFC interface 220. Therefore, passive NFC interface 220 does not need to use power to generate a transmit signal. NFC interface 330 can also be capable of transmitting data to passive NFC interface 220. Processing system 320 may transmit a wake message to passive NFC interface 220 via NFC interface 330. The wake message can include an authentication identifier, which may be stored in identifier database 350 or in some other location.

User interface 340 can include a keyboard, touchscreen, touchpad, pointer device, and/or display. Via user interface 340, a user may be able to determine if parking sensor device 301 has been successfully activated. User interface 340 may also be used to present the sensor device identifier obtained from parking sensor device 301. In some embodiments, user interface 340 may be used for a user inputting an indication of a parking space in which parking sensor device 301 is or will be installed. When the parking sensor device identifier is received from parking sensor device 301, an entry within identifier database 350 may be added that maps the parking space identifier with the parking sensor device identifier. Therefore, as part of the activation process, parking sensor device 301 can also be mapped to a particular parking space.

While this example involves parking sensor devices, such mapping of a sensor device identifier to a particular location or some other data can be performed for various types of sensors. For instance, if the sensor device is a motion sensor, as part of the activation process, the sensor device may be mapped to a particular location within a building.

In some embodiments, activation device 310 can communicate with network 360, either via a wired or wireless communication interface. Network 360, can include a private network (e.g., corporate local area network) and/or public network (e.g., the Internet). Activation device 310 can use network 360 to communicate with cloud-based server system 370. Mappings of sensor device identifiers and parking spaces (or locations or some other linked data) may be uploaded to cloud-based server system 370 from activation device 310. As such, cloud-based server system 370 can be updated with indications of the activated sensor devices and associated data, such as where the sensor devices have been installed. Cloud-based server system 370 can maintain a database indicating the sensor devices that have been activated and linked data, such as the installation location or parking space.

Figure 4:
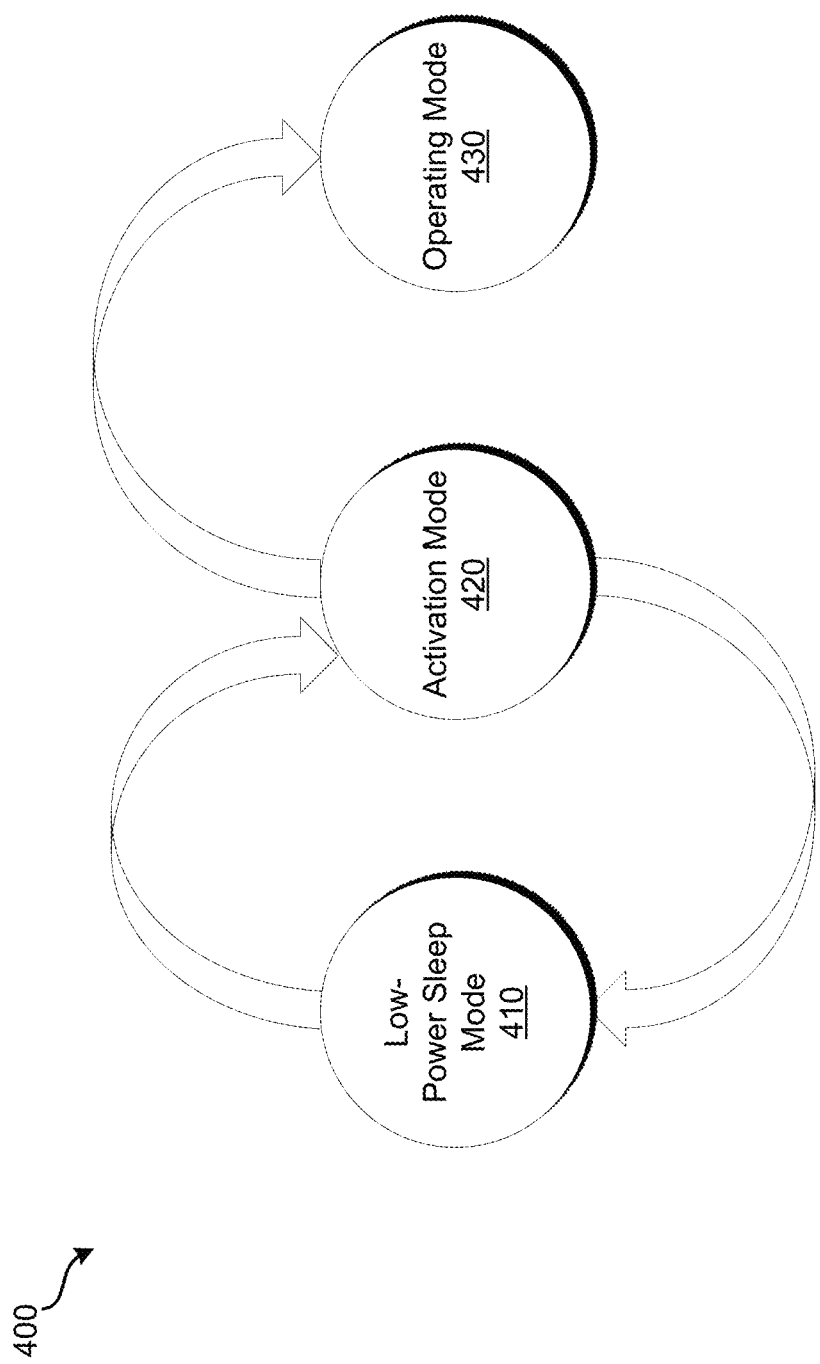
FIG. 4 illustrates an embodiment of a state diagram that the sensor device may follow.

FIG. 4 illustrates an embodiment of a mode diagram 400 that the sensor device may follow. Mode 430 may result in the greatest power consumption by the sensor device; mode 420 may result in less power usage than mode 430; and mode 410 may result in the least power usage of the three modes. In mode 410, all components of the sensor device may remain deactivated except for sufficient processing capabilities to receive a wake up message. When a message is received via the passive NFC interface, mode 410 may be transitioned to mode 420. At mode 420, more power may be consumed than mode 410. In mode 420, components may remain deactivated except for sufficient processing capabilities to analyze the wake up message and determine if it is authenticated. In some embodiments, the transmission of a sensor device identifier may also be performed as part of mode 420.

If authentication fails, the sensor device may return to mode 410. If authentication succeeds, the sensor device may permanently transition to operating mode 430. By permanently transitioning, unless a special reset process is followed (e.g., reinstalling software of the sensor device), the sensor device may remain in operating mode 430 for the rest of the device's functional life. Even if the battery of the sensor device is removed and replaced, once in operating mode 430, the sensor device may remain in operating mode 430. Therefore, once operating mode 430 is activated, the sensor device may remain permanently in mode 430. In operating mode 430, the components, such as sensors and wireless communication interfaces, of the sensor device may be functional and enabled. Therefore, significantly more power may be consumed in mode 430 than in mode 410 or mode 420.

Figure 5:
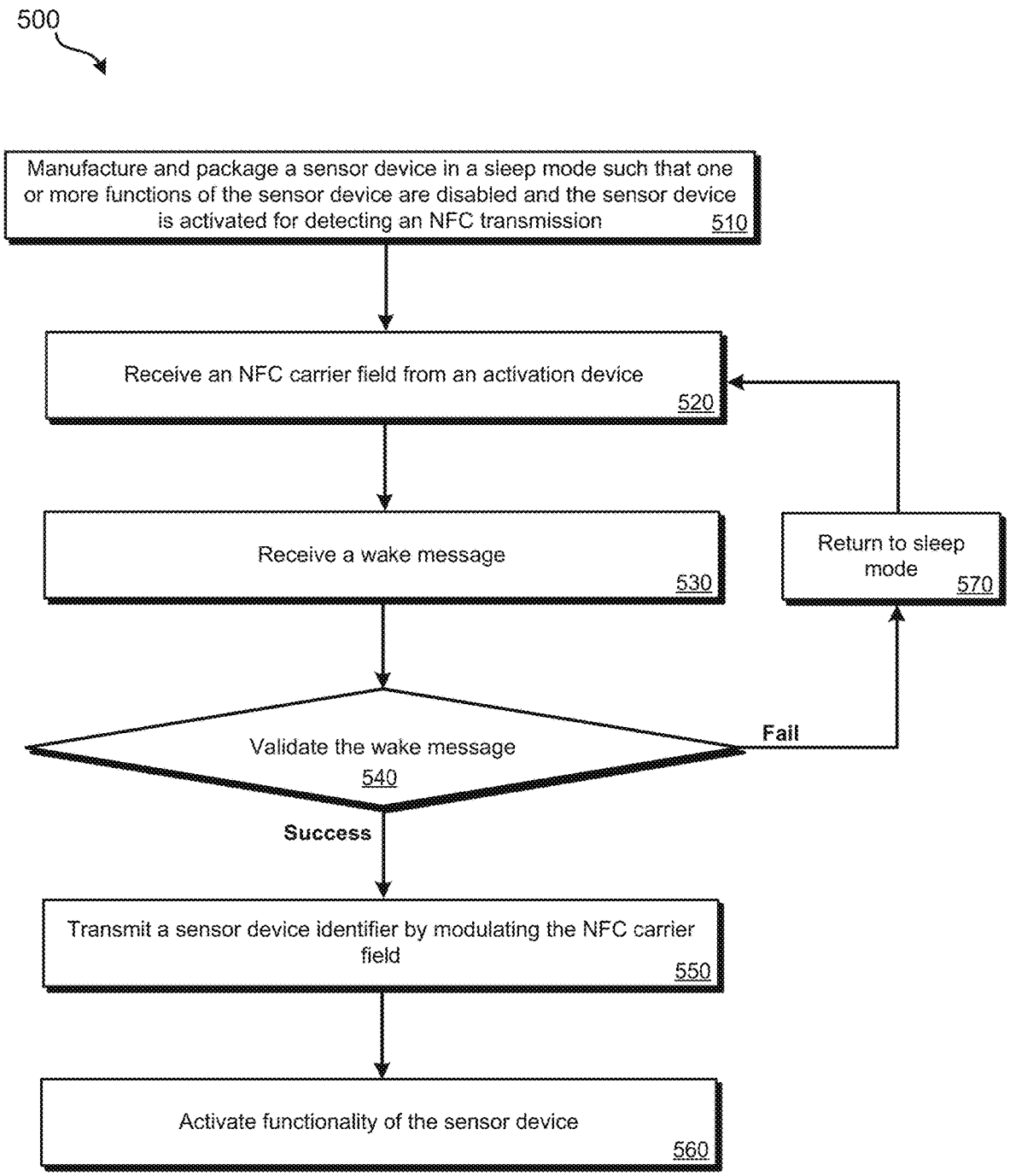
FIG. 5 illustrates an embodiment of a method for low-power wireless sensor device activation.

Various methods may be performed using the arrangements detailed in relation to FIGS. 1-3. FIG. 5 illustrates an embodiment of a method 500 for low-power wireless sensor device activation. Method 500 may be performed using sensor device 200 of FIG. 2 or system 300 of FIG. 3. In some embodiments, the sensor device of method 500 is a parking sensor device.

At block 510, a sensor device may be manufactured and, possibly, packaged. The sensor device, as part of the manufacturing process, may be initially set to a low-power sleep mode, such as mode 410 of FIG. 4. While in the sleep mode, all functions of the sensor device may be disabled except for the ability to detect an NFC communication being received via a passive NFC interface of the sensor device.

Once in the sleep state at block 510, a significant amount of time may elapse, such as days, weeks, months or even years, before block 520 is performed. At block 520, an NFC carrier field may be received by the passive NFC interface of the sensor device. The NFC carrier field may be modulated by the passive NFC interface of the sensor device in order to send data to the activation device. The NFC carrier field being present may serve as a trigger to wake the sensor device into an activation state, such as mode 420 of FIG. 4. Data may also be transmitted to the passive NFC device, such as a wake message. In some embodiments, receipt of the wake message causes the sensor device to transition into the activation mode. While in the activation mode, a processing system of the sensor device may be activated such that it can determine whether the sensor device should be transitioned to an operating mode.

At block 530, a wake message can be received by the passive NFC interface. The wake message can include an instruction to wake (or it can be inherent) and may include an authentication identifier. The wake instruction may only be performed if the authentication identifier is successfully authenticated. The authentication identifier may be a form of shared secret such that the authentication identifier is encoded onto the sensor device at the time of manufacture. In some embodiments, a large number of sensor devices may be coded with a same authentication identifier. Alternatively, each sensor device may be encoded with a unique authentication identifier.

At block 540, the sensor device may validate the wake message. Validation may be performed by comparing the authentication identifier received as part of the wake message at block 530 with a stored authentication identifier. If a match is present, validation may be successful and method 500 may proceed to block 550. If a match is not present, validation may fail and method 500 may proceed to block 570. At block 570, the sensor device may leave activation mode and revert to being in the low-power sleep mode. The sensor device may then wait for a future NFC carrier field and wake message to be received to reassess.

In some embodiments, if more than a predefined number of wake messages are sent in a window of time and the wake message is not successfully validated, the sensor device may enter the sleep mode and remain within the sleep mode for a predefined period of time, without the possibility of being entered into the activation mode. That is, the processing system may ignore NFC data for a predefined period of time (e.g., an hour, a day), if too many failed attempts to validate occur.

At block 550, a sensor device identifier may be transmitted to the activation device by the NFC carrier field being modulated. By only performing field modulation, the amount of power needed to transmit the sensor device identifier may be kept low. At block 560, the sensor device may transition from the activation mode to an operating mode. In the operating mode, all components of the sensor device may be activated. Therefore, for example, one or more sensors and/or one or more wireless communication interfaces may be activated. Additionally or alternatively, the processing system may exit a low power mode and be fully operational for performing processing functions.

In some embodiments, the activation device, in response to receiving the sensor device identifier may map the sensor device identifier to a piece of data, such as a location or parking space identifier that has been (or will be) supplied, such as via user input. For example, for a parking sensor, in response to receiving a sensor device identifier at block 550, the activation device may record a location that is mapped to the parking sensor.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for performing wireless sensor device activation, the method comprising:
   manufacturing a sensor device such that a function of the sensor device is disabled and the sensor device is activated for passive near-field communication (NFC), wherein:
      the sensor device comprises a magnetometer and the function of the sensor device that is disabled at manufacture is making measurements using the magnetometer;
      a housing of the sensor device is sealed such that only wireless communication with the sensor device is available;

receiving, by the sensor device, an NFC carrier field from an activation device;

receiving, by the sensor device, via NFC, a wake message;

validating, by the sensor device, the wake message;

in response to validating the wake message, transmitting a sensor device identifier by modulating the NFC carrier field; and in response to validating the wake message, activating the function of the sensor device that was disabled when the sensor device was manufactured.

2. The method for performing the wireless sensor device activation of claim 1, wherein the sensor device is a parking sensor that detects whether a vehicle is present above the parking sensor.

3. The method for performing the wireless sensor device activation of claim 2, wherein manufacturing further comprises disabling a plurality of functions of the sensor device.

4. The method for performing the wireless sensor device activation of claim 3, wherein one or more wireless communication interfaces are disabled at manufacture.

5. The method for performing the wireless sensor device activation of claim 4, further comprising:

receiving, by the activation device, the sensor device identifier; and mapping, by the activation device, the sensor device identifier to a parking space of a parking facility.

6. The method for performing the wireless sensor device activation of claim 1, wherein validating the wake message comprises:

comparing an authentication identifier received as part of the wake message with a stored authentication identifier.

7. The method for performing the wireless sensor device activation of claim 6, wherein validating the wake message further comprises:

determining that the authenticated identifier and the stored authentication identifier match.

8. The method for performing the wireless sensor device activation of claim 1, wherein at least one month elapses between manufacturing the sensor device and activating the function of the sensor device.

9. A sensor device that performs wireless activation, the sensor device comprising:

a housing that is sealed at manufacture to an outside environment;

a battery sealed within the housing;

a passive near-field communication (NFC) interface sealed within the housing, wherein the passive NFC interface is configured to be powered by an NFC carrier field received from an activation device;

a sensor sealed within the housing, wherein:

the sensor is disabled at manufacture; and the sensor is a magnetometer and is disabled at manufacture such that measurements are not output by the magnetometer; and a processing system sealed within the housing that communicates with the passive NFC interface and the sensor, the processing system being placed in a sleep mode at manufacture, wherein the processing system is configured to:

receive a wake message via the passive NFC interface;

validate the wake message;

in response to validating the wake message, cause the passive NFC interface to transmit a sensor device identifier by modulating the NFC carrier field; and in response to validating the wake message, activate the sensor that was disabled at manufacture.

10. The sensor device that performs the wireless activation of claim 9, wherein the sensor device is a parking sensor that detects whether a vehicle is present above the parking sensor.

11. The sensor device that performs the wireless activation of claim 10, wherein the sensor device further comprises a wireless communication interface, wherein the wireless communication interface is disabled at manufacture.

12. The sensor device that performs the wireless activation of claim 11, wherein the processing system is further configured to activate an operating mode in response to validating the wake message.

13. The sensor device that performs the wireless activation of claim 9, wherein the processing system being configured to validate the wake message comprises the processing system being configured to:

compare an authentication identifier received as part of the wake message with a stored authentication identifier.

14. The sensor device that performs the wireless activation of claim 13, wherein the processing system being configured to validate the wake message comprises the processing system being configured to:

determine that the authenticated identifier and the stored authentication identifier match.

15. A system that performs wireless activation, the system comprising:

an activation device that creates an NFC carrier field; and a sensor device, comprising:

a housing that is sealed at manufacture to an outside environment;

a battery sealed within the housing;

a passive near-field communication (NFC) interface sealed within the housing, wherein the passive NFC interface is configured to be powered by the NFC carrier field received from the activation device;

a sensor sealed within the housing, wherein the sensor is disabled at manufacture, wherein the sensor is a magnetometer;

a processing system sealed within the housing that communicates with the passive NFC interface and the sensor, the processing system being placed in a sleep mode at manufacture, wherein the processing system is configured to:

receive a wake message via the passive NFC interface;

validate the wake message;

in response to validating the wake message, cause the passive NFC interface to transmit a sensor device identifier by modulating the NFC carrier field; and in response to validating the wake message, activate from the sleep mode and activate the sensor.

16. The system of claim 15, wherein the activation device is configured to:

receive the sensor device identifier; and map the sensor device identifier to a parking space of a parking facility.

17. The system of claim 15, wherein the processing system being configured to validate the wake message comprises the processing system being configured to:

compare an authentication identifier received as part of the wake message with a stored authentication identifier; and determine that the authenticated identifier and the stored authentication identifier match.

18. The system of claim 15, wherein the sensor device further comprises a wireless interface that is disabled at manufacture and wherein the processing system is further configured to activate the wireless interface in response to validating the wake message.

\* \* \* \* \*